(12) United States Patent
Srinivasan et al.

(10) Patent No.: US 8,649,262 B2
(45) Date of Patent: Feb. 11, 2014

(54) DYNAMIC CONFIGURATION OF POTENTIAL LINKS BETWEEN PROCESSING ELEMENTS

(75) Inventors: Sadagopan Srinivasan, Hillsboro, OR (US); Michael W. Leddige, Beaverton, OK (US); Bin Li, Princeton, NJ (US); Michael Espig, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 12/241,619

(22) Filed: Sep. 30, 2008

(65) Prior Publication Data
US 2010/0080132 A1 Apr. 1, 2010

(51) Int. Cl.
*H04L 12/26* (2006.01)

(52) U.S. Cl.
USPC .......................................................... 370/229

(58) Field of Classification Search
USPC .......... 370/229–236, 329–349, 464–469, 477
See application file for complete search history.

(56) References Cited

U.S. PATENT DOCUMENTS

| | | | | |
|---|---|---|---|---|
| 6,792,003 | B1 * | 9/2004 | Potluri et al. .................. | 370/476 |
| 7,404,023 | B1 * | 7/2008 | Kaszynski ...................... | 710/240 |
| 7,672,340 | B2 * | 3/2010 | Schoch et al. ................ | 370/535 |
| 8,270,434 | B2 * | 9/2012 | Powell ........................... | 370/468 |
| 2002/0009834 | A1 * | 1/2002 | Watanabe et al. .............. | 438/142 |
| 2002/0116522 | A1 * | 8/2002 | Zelig .............................. | 709/235 |
| 2004/0105397 | A1 * | 6/2004 | Kikinis .......................... | 370/293 |
| 2005/0262368 | A1 * | 11/2005 | Cherukuri et al. ............. | 713/324 |
| 2006/0034295 | A1 * | 2/2006 | Cherukuri et al. ........ | 370/395.52 |
| 2006/0062233 | A1 * | 3/2006 | Brewer et al. .................. | 370/412 |
| 2006/0285847 | A1 * | 12/2006 | McCall et al. .................. | 398/73 |
| 2007/0201380 | A1 * | 8/2007 | Ma et al. ........................ | 370/254 |
| 2008/0194216 | A1 * | 8/2008 | Rofougaran ................ | 455/127.5 |
| 2008/0304519 | A1 * | 12/2008 | Koenen et al. ................. | 370/477 |
| 2009/0227205 | A1 * | 9/2009 | Rofougaran .................. | 455/41.1 |
| 2010/0246396 | A1 * | 9/2010 | Licardie et al. ............... | 370/232 |

OTHER PUBLICATIONS

Aline Mello et al., "Virtual Channels in Networks on Chip: Implementation and Evaluation on Hermes NoC", SBCC1'05, Sep. 4-7, 2005, AMC 1-59593-174-0, 6pgs.

* cited by examiner

*Primary Examiner* — Kwang B Yao
*Assistant Examiner* — Juvena Loo
(74) *Attorney, Agent, or Firm* — Buckley, Maschoff & Talwalkar LLC (57) ABSTRACT

According to some embodiments, first and second processing elements may be provided on a die, and there may be a plurality of potential communication links between the first and second processing elements. Moreover, control logic may be provided on the die to dynamically activate at least some of the potential communication links (e.g., based on a current bandwidth appropriate between the first and second processing elements).

19 Claims, 6 Drawing Sheets

DYNAMIC CONFIGURATION OF POTENTIAL LINKS BETWEEN PROCESSING ELEMENTS

BACKGROUND

A device may include a series of processing elements to process information. For example, a single die might include a series of processing elements to process audio and/or video information. In some cases, the processing elements may exchange information with each other through links or interconnects. Moreover, the appropriate bandwidth for a particular interconnect between processing elements can vary depending on which applications and/or modules are currently being executed.

DETAILED DESCRIPTION

Figure 1:
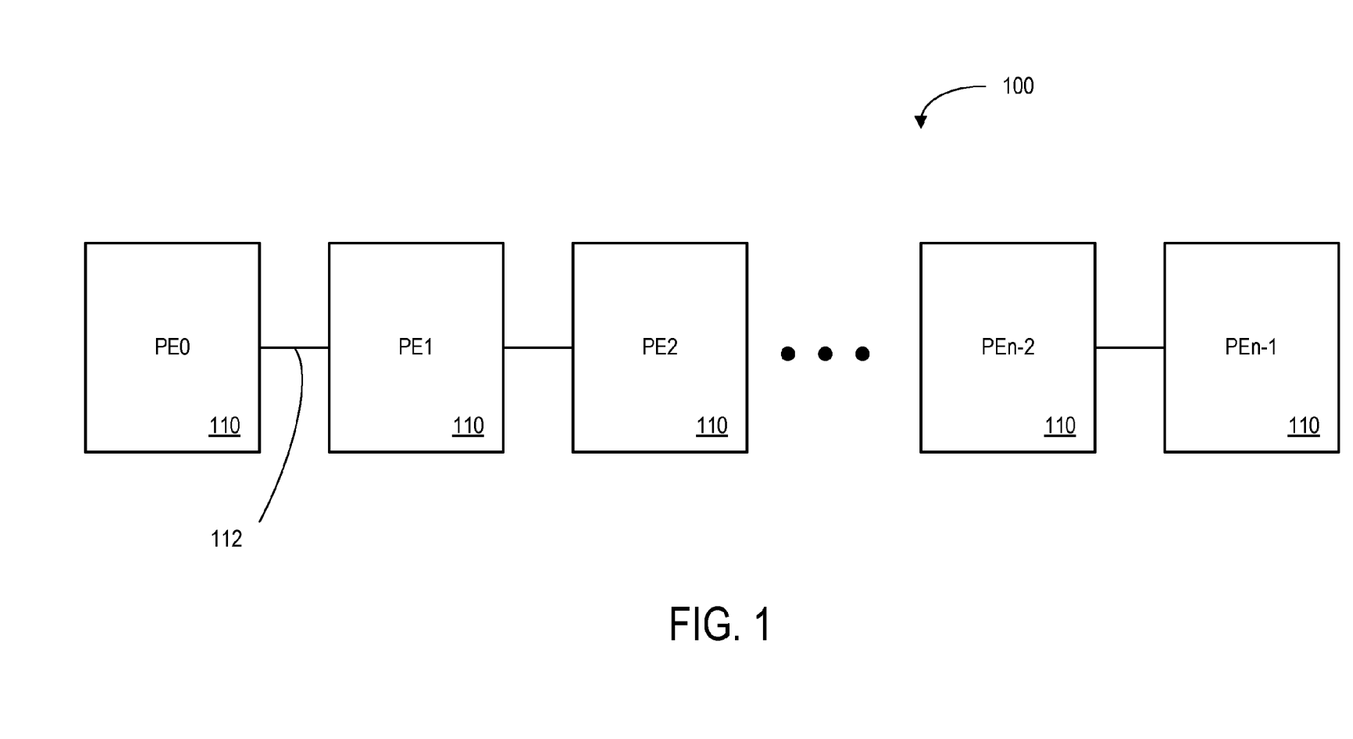
FIG. 1 is a block diagram of a system having a series of processing elements.

A device, such as one associated with a System on a Chip (SoC) or a Network on a Chip (NoC) die, may include multiple processing elements to process information. For example, a single die might include a series of processing elements to process audio and/or video information. FIG. 1 is a block diagram of a system 100 having a series of processing elements 110. In particular, the system 100 includes n processing elements: PE0 through PEn−1. The processing elements 110 might comprise, for example, a series of "microengines" and/or Reduced Instruction Set Computer devices that sequentially process a packet of information. In some cases, the processing elements 110 may need to exchange information. For example, PE1 might provide information associated with audio or video information to PE2.

In some cases, the processing elements 110 may exchange information with each other through communication links or interconnects 112. Moreover, the appropriate bandwidth for a particular link 112 between processing elements 110 can vary depending on which applications and/or modules are currently being executed. By way of example only, the link 112 between PE0 and PE1 might have an 80 KiloByte per second (KB/sec) bandwidth requirement when audio information is being processed and a 10 MegaByte per second (MB/Sec) bandwidth requirement when video information is being processed. Typically, a designer of the system 100 might provide sufficient bandwidth via the links 112 so as to handle a substantially worst case scenario. Such an approach, however, may unnecessarily increase an amount power consumed by the system 100 (e.g., because the links 110 may still consume an increased amount of power even when being used to transfer information at less than their maximum capacity). To avoid such a result, a designer might instead provide only enough bandwidth via the links 112 to support typical usage (e.g., substantially less than a potential worst case scenario). Such an approach, however, may reduce the performance of the system when an increased amount of bandwidth between the processing elements is appropriate.

Note that although a particular configuration is illustrated in FIG. 1, embodiments described herein can be associated with any number of other topographies. For example, one processing element 110 might simply communicate with a single other processing element 110. As another example, one processing element 110 might be configured to communicate with three or more other processing elements 110.

Figure 2:
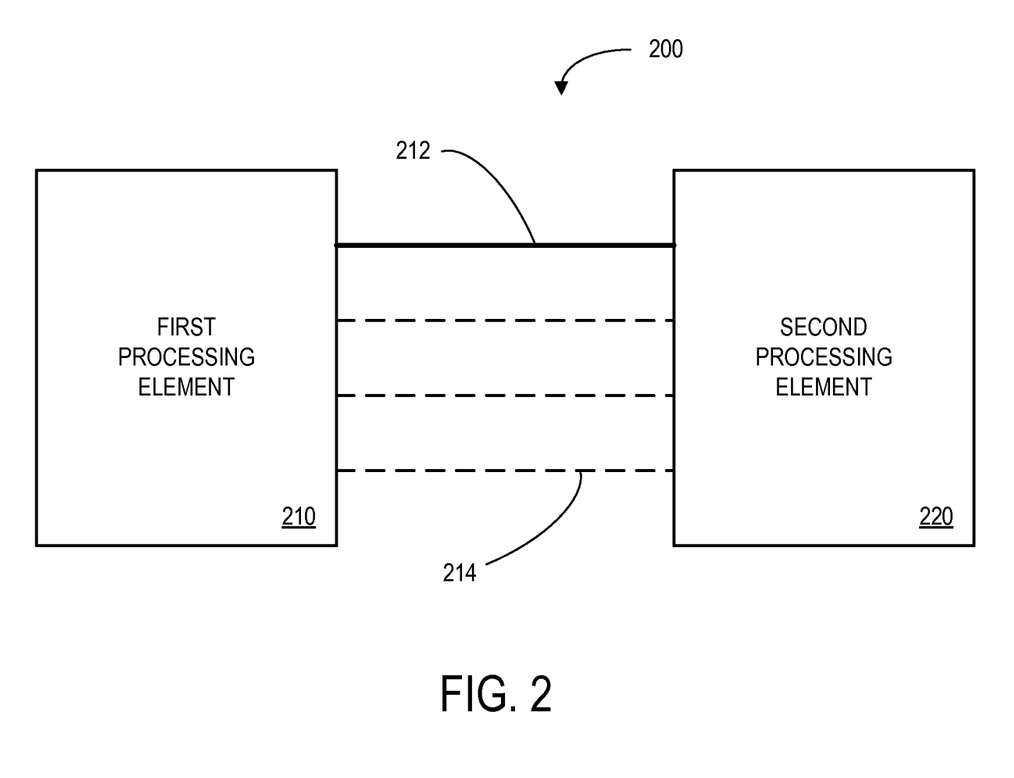
FIG. 2 is a block diagram of an apparatus having a plurality of potential communication links between processing elements according to some embodiments.

According to some embodiments of the present invention, an interconnect bandwidth between processing elements or nodes varies based on application demand. For example, FIG. 2 is a block diagram of an apparatus 200 having a plurality of potential communication links 212, 214 between processing elements 210, 220 according to some embodiments. The apparatus 200 might be associated with, for example, a SoC and/or NoC device.

In particular, the apparatus 200 includes a first processing element 210 on a die along with a second processing element 220 on the same die. Moreover, a plurality of potential communication links 212, 214 are provided between the first processing element 210 and the second processing element 220. The processing elements 210, 220 might execute various types of applications or modules, such as an Inverse Discrete Cosine Transform (IDCT) module and/or a Variable Length Decoder (VLD) module associated with audio and/or video information.

According to some embodiments, control logic may be provided to dynamically activate at least some of the potential communication links 212, 214. In particular, some of the potential communication links may be configured as active links 212 (e.g., there might be a single active link 212 as illustrated by the bold line in FIG. 2) while others are configured as inactive links 214 (e.g., there might be three inactive links 214 as illustrated by dashed lines in FIG. 2). Each active link 212 may be capable of providing a particular amount of bandwidth. Thus, by dynamically turning inactive links 214 into active links 212, the available bandwidth between the processing elements 210, 220 may be increased when appropriate. Similarly, by dynamically turning active links 212 into inactive links 214, the available bandwidth between the processing elements 210, 220 may be decreased when appropriate.

As used herein, a link might be activated by powering-up a potential communication link. Similarly, a link might be de-activated by powering-down a potential communication link. In addition to powering-up and/or powering-down potential communication links, other components associated with each link might be turned on or off. For example, de-activating a link might include powering-down a buffer and/or cross-bar associated with that link. In this way, the amount of power consumed by the apparatus 200 may be reduced when a relatively lower amount of bandwidth is currently required by the processing elements 210, 220.

Figure 3:
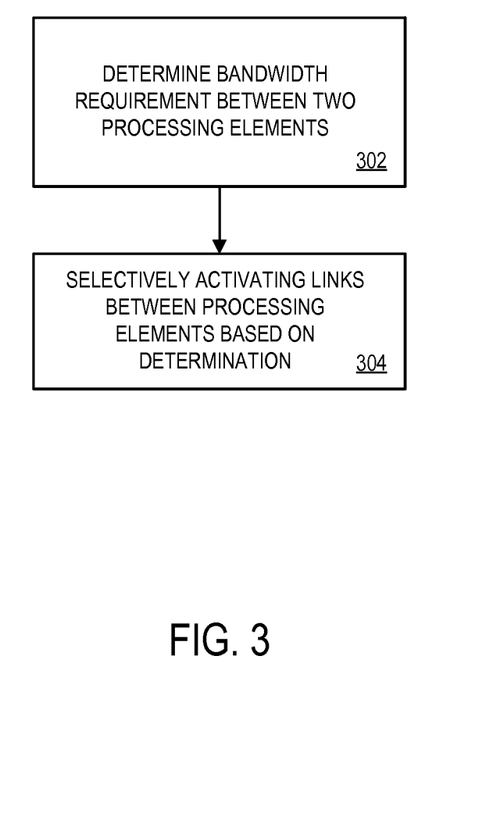
FIG. 3 is a flow chart of a method according to some embodiments.

FIG. 3 is a flow chart of a method according to some embodiments. The method may be performed, for example, by one or both of the processing elements 210, 220 described with respect to FIG. 2. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine result in performance according to any of the embodiments described herein.

At 302, a bandwidth requirement is determined between first and second processing elements on a die. By way of example, only, a dynamic determination might be based at least in part on utilization of a communication buffer. For example, when a transmit buffer holds more than a pre-determined number of entries that are waiting to be transmitted to another processing element, it may be determined that an increased amount of bandwidth is appropriate between those processing elements. Note that the determination performed at 302 might be made by, for example, a software process and/or a hardware control unit.

At 304, at least one of a plurality of links between the processing elements is selectively activated based on the determination made at 302. For example, the link itself might be powered-up along with, for example, a buffer and/or crossbar associated with that link. Note that, depending on the bandwidth requirement determined at 302, more than one additional link might be activated. Also note that the current bandwidth requirement might instead indicate that a reduced number of links currently need to be active (and one or more currently active links may be deactivated and/or powered-down at 304). The selective activation performed at 304 might be made by, for example, a software process and/or a hardware control unit. Note that, as used herein, a component might be "powered-down" by being completely turned of or by being placed in a lower power state (e.g., an ultra low power state).

Figure 4:
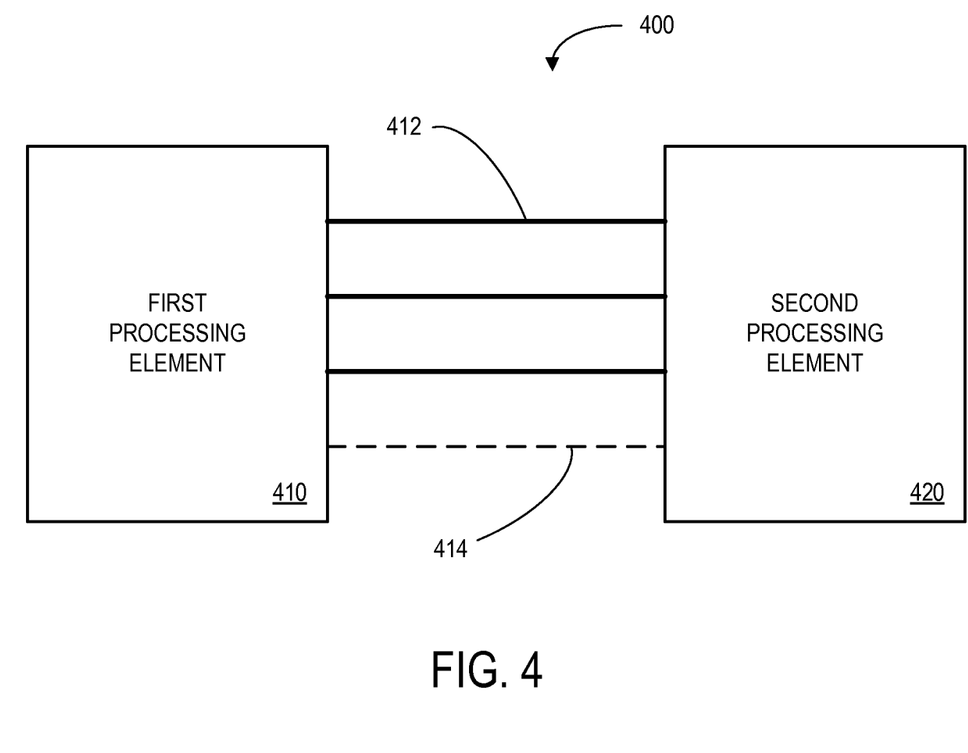
FIG. 4 is a block diagram of an apparatus wherein a number of communications links between processing elements have been activated according to some embodiments.

FIG. 4 is a block diagram of an apparatus 400 wherein a number of communications links 412, 414 between processing elements 410, 420 have been activated according to some embodiments. As before, a number of potential communication links 412, 414 are provided between a first processing element 410 and a second processing element 420. Moreover, assume that each link 412, 414 is capable of providing a unit B of link bandwidth when activated (e.g., the frequency of the link multiplied by the width of the link). Note that in FIG. 2, there was a single active link 212 and three inactive links 214 and, therefore, a bandwidth of B was available. FIG. 4, in contrast, illustrates that there are now three active links 412 and one inactive links 414 and, therefore, a bandwidth of 3×B is available between the processing elements 410, 420.

Figure 5:
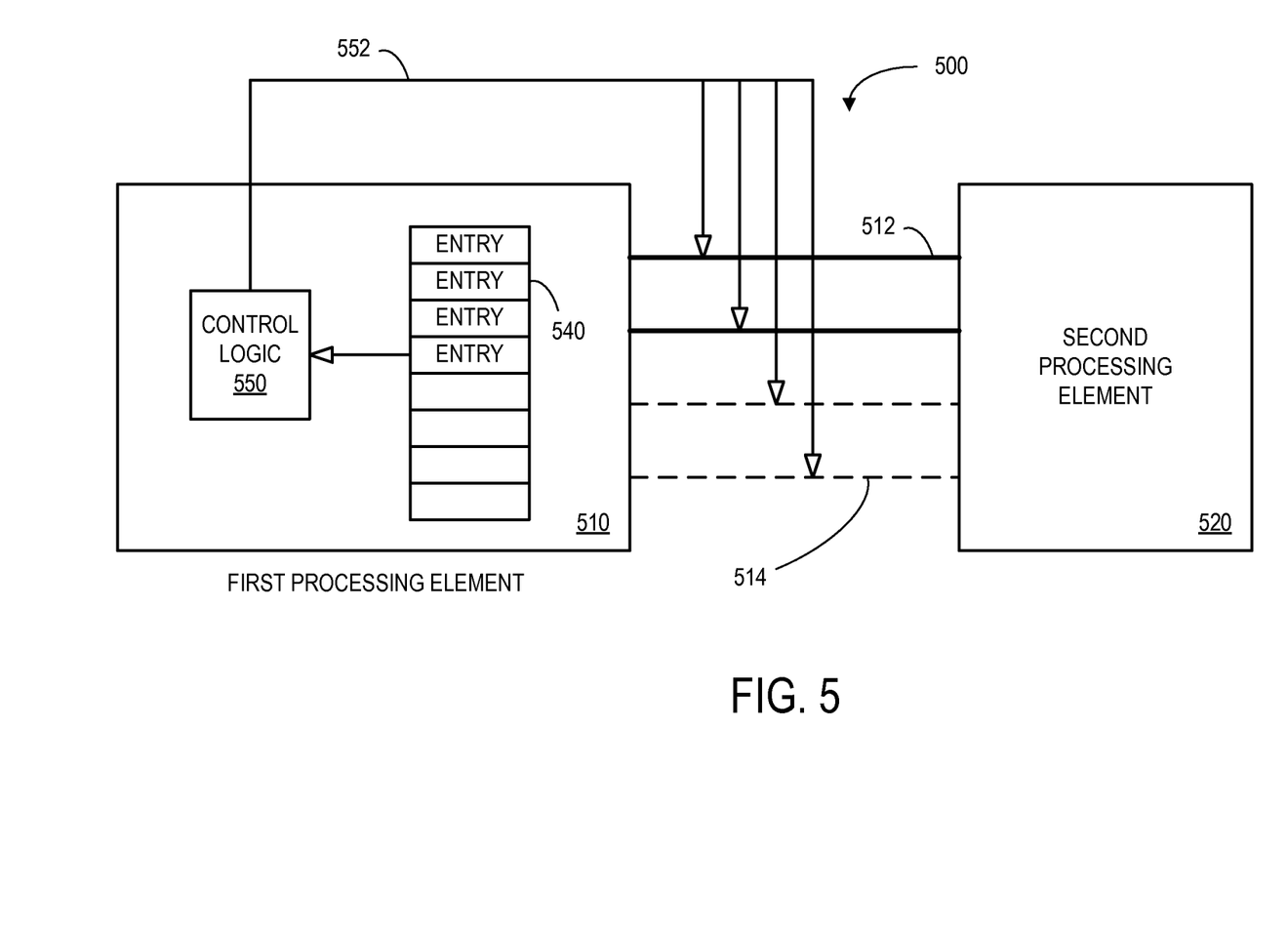
FIG. 5 is a block diagram of an apparatus including control logic within a processing element according to some embodiments.

FIG. 5 is a block diagram of an apparatus 500 including control logic 550 within a first processing element 510 according to some embodiments. As before, the first processing element 510 can exchange information with a second processing element 520 via a plurality of potential communication links 512, 514. Moreover, the first processing element 510 uses a communication buffer 540 (e.g., a transmit buffer to store entries associated with data that needs to be sent to the second processing buffer). As illustrated in FIG. 5, the buffer 540 is currently storing four entries while an addition four locations in the buffer are empty.

According to this embodiment, the control logic 550 may monitor the communication buffer 540 (e.g., to determine a number of entries currently stored in the buffer 540). Moreover, control signals or paths 552 may be provided such that the control logic 550 is able to dynamically configure each potential link as an active link 512 or an inactive link 514 as appropriate.

By way of example, the control logic 550 might determine whether the number of entries currently stored in the communication buffer 540 exceeds a pre-determined threshold value (e.g., a value selected by a system designer). If so, a pre-determined number of links may be activated or the current number of active links might be increased by a pre-determined amount (e.g., a single additional link might be added using the control signals 552). Note that the control logic 550 might comprise software and/or hardware components (e.g., hardware trip signals). Also note that a number of different threshold values might be used by the control logic. Further, according to some embodiments, the threshold value might be dynamically adjusted by the control logic 550 as appropriate. According to some embodiments, a link may be selectively powered-up based on a first threshold value and selectively powered-down based on a second threshold value (e.g., to avoid rapidly activating/deactivating a particular link). Note that threshold values might be associated with, for example, a number of entries currently stored in the buffer 540 or a percentage of space currently being utilized in the buffer 540. According to still another embodiment, links might be turned off (or on) based on a timer mechanism instead of, or in addition to, buffer occupancy.

Figure 6:
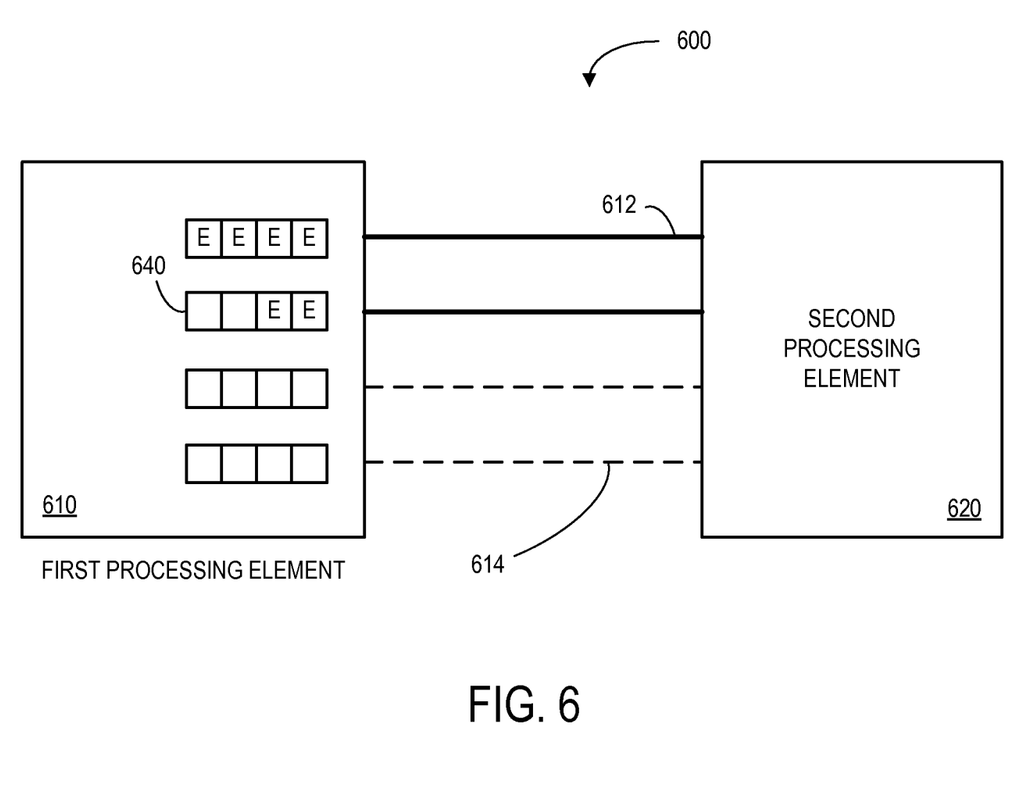
FIG. 6 is a block diagram of an apparatus wherein a processing element includes a communication buffer for each potential communication link according to some embodiments.

Although a single common buffer 540 is shown in connection with the four potential communication links 512, 514 illustrated in FIG. 5, note that any number of other arrangements might be provided. For example, FIG. 6 is a block diagram of an apparatus 600 wherein a first processing element 510 includes a communication buffer 640 for each potential communication link 612, 614 with a second processing element 620 according to some embodiments. That is, a relatively smaller, distributed buffer 640 might be provided for each link 612, 614 or land between the processing elements 610, 620.

In this case, control logic (not illustrated in FIG. 6) may monitor each entries ("E") in each buffer to determine when links should be configured as an active link 612 or an inactive link 614. By way of example, only, when the buffer 640 associated with the topmost link 612 illustrated in FIG. 6 became full, the second link may have been activated (and entries might begin to be placed in the second buffer 640).

Thus, a dynamically configurable amount of bandwidth might be provided between processing element. As a result, an amount of power consumed by, for example, a SoC or NoC die may be reduced while still providing an appropriate amount of bandwidth between nodes or processing elements on the die.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although four links between processing elements have been described herein for illustrative purposes, note that any number of potential communication links may be provided (e.g., there might be two or 16 dynamically configurable links between a pair of processing elements). Moreover, according to some embodiments, the plurality of communication links may be divided into sets of links, with each set being further divided into sub-sets of links which are all dynamically configurable.

According to some embodiments, different links between two processing elements might be associated with a different amounts of bandwidth. Consider, for example, four potential communication links with the following bandwidths: 10 KB/Sec, 20 KB/Sec, 40 KB/Sec, and 80 KB/Sec. In this case, various combinations of links could be powered-up (or powered-down) to provide an appropriate amount of bandwidth (e.g., at an even greater resolution). For example, the first and third links could be made inactive, while the second and fourth links are made active, to provide a total of 100 KB/Sec bandwidth when appropriate.

In addition, although buffer utilization has been used as an exemplary way of determining current bandwidth requirements, note that embodiments may provide any other type of determination. For example, links could be dynamically configured based on which applications and/or modules are currently being executed by the processing elements and/or which types of information are being processed (e.g., whether those elements are currently processing audio or video information). As other examples, bandwidth requirements could be determined based on an amount of traffic currently being sent (or received) by a processing element or based on a delay or latency of data being processed.

Examples provided herein have described a single processing element configuring links to a single other processing element. Embodiments, however, may be practiced with any other type of arrangement. For example, links between one processing element and a plurality of other processing elements might be dynamically configured as appropriate.

Note that embodiments may be used to process any type of information in addition to, or instead of, audio and/or video data. For example, links might be used to configure nodes in a "network processor" that facilitates an exchange of information via a network, such as a Local Area Network (LAN), or a Wide Area Network (WAN). By way of example, a network processor might facilitate an exchange of information packets in accordance with the Fast Ethernet LAN transmission standard 802.3-2002® published by the Institute of Electrical and Electronics Engineers (IEEE). Moreover, a network processor may process and/or exchange Asynchronous Transfer Mode (ATM) information in accordance with ATM Forum Technical Committee document number AF-TM-0121.000 entitled "Traffic Management Specification Version 4.1" (March 1999). A network processor may be associated with, for example, a switch, a router (e.g., an edge router), a layer 3 forwarder, and/or protocol conversion.

The several embodiments described herein are solely for the purpose of illustration. Persons skilled in the art will recognize from this description other embodiments may be practiced with modifications and alterations limited only by the claims.

What is claimed is:

1. An apparatus, comprising:
  a first processing element on a die;
  a second processing element on the die;
  a plurality of potential communication links on the die between the first and second processing elements, wherein at least some of the potential communication links are powered off, and wherein the communication links on the die are adapted to be selectively activated wherein the first processing element comprises a reduced instruction set computer processing element and the second processing element comprising a reduced instruction set computer processing element; and
  control logic on the die to monitor a buffer to determine when the buffer holds more than a pre-determined number of entries that are waiting to be transmitted in order to dynamically activate at least some of the potential communication links by transitioning the potential communication links from a powered off state to a powered on state by powering up the at least some of the potential communication links based on the determination that the buffer holds more than the pre-determined number of entries.

2. The apparatus of claim 1, wherein said dynamic activation comprises selectively performing at least one of: (i) powering-up a potential communication link to create an active link, or (ii) powering-down a potential communication link to create an inactive link.

3. The apparatus of claim 2, wherein said selective powering-up or powering-down is further performed with respect to a buffer associated with the link.

4. The apparatus of claim 1, wherein the buffer is associated with the plurality of links.

5. The apparatus of claim 1, wherein said selective powering-up or powering-down is based on entries stored in a plurality of buffers, each buffer being associated with a link.

6. The apparatus of claim 1, wherein said selective powering-up or powering down is further based on a threshold value.

7. The apparatus of claim 6, wherein the threshold value is dynamically adjusted.

8. The apparatus of claim 6, wherein a link is to be selectively powered-up based on a first threshold value and selectively powered-down based on a second threshold value.

9. The apparatus of claim 1, wherein the apparatus is associated with at least one of: (i) a system on a chip, or (ii) a network on a chip.

10. A method, comprising:
  determining a bandwidth requirement between first and second processing elements on a die by monitoring a buffer to determine when the buffer holds more than a pre-determined number of entries that are waiting to be transmitted, the first processing element and the second processing element each comprising a reduced instruction set computer processing element; and
  selectively activating at least one of a plurality of communication links by transitioning at least one of the plurality communication links from a powered off state to powered on state by powering up the at least one of a plurality of communication links based on the determination that the buffer holds more than the pre-determined number of entries, wherein the communication links on the die are adapted to be selectively activated and wherein at least one other component associated with each link is transitioned from a powered off state to powered on when its respective link is powered on.

11. The method of claim 10, further comprising:
  selectively de-activating at least one of the plurality of links based on said determination.

12. The method of claim 10, wherein said selective activation is performed by at least one of: (i) a software process, or (ii) a hardware control unit.

13. The method of claim 10, wherein said determination is based at least in part on utilization of a communication buffer.

14. The method of claim 10, wherein said selective activation is associated with at least one of: (i) powering-up a buffer associated with the link, (ii) powering-up a cross-bar associated with the link, or (iii) powering-up the link.

15. A non-transitory computer-readable storage medium stored thereon instructions that when executed by a machine result in the following:
  determining a bandwidth requirement between first and second processing elements on a die by monitoring a buffer to determine when the buffer holds more than a pre-determined number of entries that are waiting to be transmitted wherein the first processing element comprises a reduced instruction set computer processing element and the second processing element comprising a reduced instruction set computer processing element; and selectively activating at least one of a plurality of communication links on the die between the processing elements based on said determination by transitioning at least one of the plurality communication links from a powered off state to powered on state by powering up the at least one of a plurality of communication links based on the determination that the buffer holds more than the pre-determined number of entries, wherein the communication links on the die are adapted to be selectively activated.

16. The medium of claim 15, wherein said determination is based at least in part on monitoring utilization of a communication buffer.

17. The medium of claim 15, wherein said selectively activation is further based on a threshold value.

18. The medium of claim 15, wherein a link may be selectively powered-up based on a first pre-determined number of entries and selectively powered-down based on a second pre-determined number of entries.

19. The method of claim 1, wherein at least one other component associated with each link is transitioned from a powered down state to powered up state when its respective link is powered on.

* * * * *